United States Patent
Jackson et al.

(10) Patent No.: US 10,641,528 B2
(45) Date of Patent: May 5, 2020

(54) COOLING OF PUMP HEADS IN CARBON DIOXIDE CHROMATOGRAPHY SYSTEMS

(71) Applicant: Waters Technologies Corporation, Milford, MA (US)

(72) Inventors: Michael R. Jackson, Woonsocket, RI (US); Christopher Seith, Franklin, MA (US); Nathan Barrett, Milford, MA (US); Kara O'Donnell, Watertown, MA (US); Neal B. Almeida, Cumberland, RI (US); Wen Lu, Westborough, MA (US); James E. Usowicz, Webster, MA (US); Maruth Sok, Providence, RI (US); Kurt D. Joudrey, Chelmsford, MA (US); Joshua A. Shreve, Franklin, MA (US)

(73) Assignee: Waters Technologies Corporation, Milford, MA (US)

( * ) Notice: Subject to any disclaimer, the term of this patent is extended or adjusted under 35 U.S.C. 154(b) by 197 days.

(21) Appl. No.: 15/565,324

(22) PCT Filed: Apr. 7, 2016

(86) PCT No.: PCT/US2016/026386
§ 371 (c)(1),
(2) Date: Oct. 9, 2017

(87) PCT Pub. No.: WO2016/164544
PCT Pub. Date: Oct. 13, 2016

(65) Prior Publication Data
US 2018/0313585 A1    Nov. 1, 2018

Related U.S. Application Data

(60) Provisional application No. 62/145,837, filed on Apr. 10, 2015.

(51) Int. Cl.
F25B 25/00 (2006.01)
G01N 30/30 (2006.01)
(Continued)

(52) U.S. Cl.
CPC ............ F25B 25/005 (2013.01); B01D 15/18 (2013.01); B01D 15/40 (2013.01); G01N 30/30 (2013.01); F04B 2205/09 (2013.01)

(58) Field of Classification Search
CPC ....... F25B 25/005; B01D 15/18; B01D 15/40; G01N 30/30; F04B 2205/09
(Continued)

(56) References Cited

U.S. PATENT DOCUMENTS 4,990,250 A * 2/1991 Hellinger ............... G01N 30/32
                                                    210/101
5,094,753 A    3/1992 Allington et al.
(Continued)

FOREIGN PATENT DOCUMENTS

DE    20 2010 015 30 U1    3/2011
EP           0672831 A2     9/1995
(Continued)

OTHER PUBLICATIONS

Hancock. "A Novel Device for Cooling HPLC Pump Heads Pumping Supercritical Fluids." J. High Res. Chromatog. 17.11(1994):795-796.
(Continued)

*Primary Examiner* — Natalie Huls
*Assistant Examiner* — Monica S Young
(74) *Attorney, Agent, or Firm* — Womble Bond Dickinson (US) LLP; Deborah M. Vernon; Heath T. Misley

(57) ABSTRACT

The present disclosure relates to methodologies, systems and apparatus for cooling pump heads and providing balanced cooling and heat transfer between multiple pump
(Continued)

heads. Multi-pump systems that are used to pump fluids that vary greatly in density with minor changes in temperature, such as the mobile phase of a CO2-based chromatography system, require highly stable temperature conditions. In order to achieve a substantially equal average heat transfer between multiple pump heads and a coolant fluid, coolant fluid may be flowed through coolant passageways within the pump heads in a recursive and/or parallel coolant flow patterns. Such recursive and/or parallel coolant fluid flow patterns provide increased stability in temperature, compressibility, and density of the fluids passing through a multi-pump system.

7 Claims, 7 Drawing Sheets

(51) Int. Cl.
    *B01D 15/40*     (2006.01)
    *B01D 15/18*     (2006.01)

(58) Field of Classification Search
    USPC .......................................................... 73/23.35
    See application file for complete search history.

(56) References Cited

U.S. PATENT DOCUMENTS

| | | | | |
|---|---|---|---|---|
| 5,147,538 | A * | 9/1992 | Wright | B01D 11/0203 |
| | | | | 210/181 |
| 5,750,029 | A | 5/1998 | Houck et al. | |
| 2006/0180300 | A1 | 8/2006 | Lenehan et al. | |
| 2011/0259822 | A1 * | 10/2011 | Al-Jlil | B01D 61/364 |
| | | | | 210/615 |
| 2013/0330209 | A1 * | 12/2013 | Joudrey | B01F 15/0404 |
| | | | | 417/54 |
| 2014/0190183 | A1 * | 7/2014 | Berger | F04B 39/064 |
| | | | | 62/3.2 |

FOREIGN PATENT DOCUMENTS

| | | |
|---|---|---|
| WO | 2012099763 A1 | 7/2012 |
| WO | 2012122361 A2 | 9/2012 |

OTHER PUBLICATIONS

International Search Report and Written Opinion for International Patent Application No. PCT/US2016/026386 dated Jun. 13, 2016 and dated Jul. 11, 2016.

* cited by examiner

COOLING OF PUMP HEADS IN CARBON DIOXIDE CHROMATOGRAPHY SYSTEMS

RELATED APPLICATIONS

This application is a National Stage Application of International Application No. PCT/US2016/026386 filed Apr. 7, 2016, which claims priority to U.S. Provisional Patent Application Ser. No. 62/145,837 entitled "Cooling of Pump Heads in Carbon Dioxide Chromatography Systems," filed on Apr. 10, 2015, the content of each of which is hereby incorporated by reference in its entirety.

TECHNICAL FIELD

The present disclosure relates to techniques for cooling of pump heads in carbon dioxide chromatography systems. The present disclosure also relates to methodologies, systems and apparatus for providing a substantially equal heat transfer from each of at least two pump heads.

BACKGROUND OF THE TECHNOLOGY

In general, multiple pumps may be arranged in a parallel or serial fashion to pump fluids in a fluid chromatography system. Chromatography involves the flowing of a mobile phase over a stationary phase to effect separation. To speed-up and enhance the efficiency of the separation, pressurized mobile phases were introduced. Carbon dioxide based chromatographic systems use $CO_2$ as a component of the mobile phase flow stream, and the $CO_2$ based mobile phase is delivered from the pumps and carried through the separation column as a pressurized liquid. In systems using $CO_2$ as a mobile phase component, one challenge is pumping the $CO_2$, as small changes in temperature and/or pressure greatly change the density of $CO_2$. Any fluctuation in the density of the $CO_2$ elevates compressibility issues, frustrating typical compressibility compensation schemes. Therefore, a need exists for chromatography systems that provide increased stability and control of temperature and pressure levels.

BRIEF SUMMARY OF THE TECHNOLOGY

Exemplary embodiments of the present technology are directed to pump head cooling systems for providing balanced cooling and heat transfer between multiple pump heads. Further, the embodiments are related to methodologies, systems and apparatus for pump head cooling systems that employ recursive or parallel coolant flow patterns to achieve a substantially equal average heat transfer between the pump heads and the coolant fluid. In particular, some embodiments are related to fluid cooling systems for cooling pump heads that are used in a $CO_2$-based chromatography systems, i.e., a chromatography system in which the mobile phase includes $CO_2$.

In one aspect, the present technology relates to a pump head cooling system. The system includes a first pump head defining a first coolant passageway and a second coolant passageway, each passageway having an inlet into the first pump head and an outlet out of the first pump head. The system also includes a second pump head defining a third coolant passageway and a fourth coolant passageway, each passageway having an inlet into the second pump head and an outlet out of the second pump head. In the system, the outlet of the first coolant passageway is fluidly coupled to the inlet of the third coolant passageway, the outlet of the third coolant passageway is fluidly coupled to the inlet of the fourth coolant passageway, and the outlet of the fourth coolant passageway is fluidly coupled to the inlet of the second coolant passageway.

Embodiments of this aspect of the technology can include one or more of the following features. In some embodiments, the first pump head and the second pump head are composed of, or composed in part of, stainless steel. In some embodiments, the first pump head and the second pump head are adapted to operate at flow rates between 0.50-150.00 mL/min. In some embodiments, the first pump head and the second pump head are adapted to operate at pressures up to 50 MPa. In some embodiments, the system also includes a coolant pump adapted to pump a coolant fluid through the first coolant passageway, the second coolant passageway, the third coolant passageway, and the fourth coolant passageway. In some embodiments, the system also includes a fluid chiller adapted to chill a coolant fluid prior to pumping the coolant fluid through the first coolant passageway. In some embodiments, the system also includes: a first coolant tube adapted to fluidly couple the outlet of the first coolant passageway to the inlet of the third coolant passageway, a second coolant tube adapted to fluidly couple the outlet of the third coolant passageway to the inlet of the fourth coolant passageway, and a third coolant tube adapted to fluidly couple the outlet of the fourth coolant passageway to the inlet of the second coolant passageway.

According to another aspect, the present technology relates to a pump head cooling system. The system includes a first pump head defining a first coolant passageway and a second coolant passageway, each passageway having an inlet into the first pump head and an outlet out of the first pump head, and wherein the outlet of the first coolant passageway is fluidly coupled to the inlet of the second coolant passageway. The system also includes a second pump head defining a third coolant passageway and a fourth coolant passageway, each passageway having an inlet into the second pump head and an outlet out of the second pump head, and wherein the outlet of the third coolant passageway is fluidly coupled to the inlet of the fourth coolant passageway. The system also includes at least one coolant pump adapted to pump a first stream of coolant fluid through the first pump head and pump a second stream of coolant fluid through the second pump head, such that an average heat transfer between the first pump head and the first stream of coolant fluid is substantially equal to an average heat transfer between the second pump head and the second stream of coolant fluid.

Embodiments of this aspect of the technology can include one or more of the following features. In some embodiments, the system also includes a first fluid connector having one inlet and two outlets, wherein a first outlet is fluidly coupled to an entrance of the first coolant passageway and a second outlet is fluidly coupled to an entrance of the third coolant passageway. In some embodiments, the system also includes a fluid connector having two inlets and a single outlet, wherein a first inlet is fluidly coupled to an outlet of the second coolant passageway and a second inlet is fluidly coupled to an outlet of the fourth coolant passageway. In some embodiments, the system also includes a fluid chiller adapted to chill the first stream of coolant fluid and the second stream of coolant fluid after exiting the coolant pump. In some embodiments, the system also includes a control system adapted to measure a temperature of the first pump head and a temperature of the second pump head and apply cooling to the pump head cooling system to maintain a temperature difference between the first pump head and the second pump head below 1.0 degree Celsius.

According to another aspect, the present technology relates to a method of cooling pump heads. The method includes flowing at least one stream of coolant fluid through a plurality of coolant passageways within a first pump head and a second pump head along a coolant fluid path. The method also includes providing an average heat transfer between the first pump head and the coolant fluid that is substantially equal to an average heat transfer between the second pump head and the coolant fluid.

Embodiments of the above aspect can include one or more of the following features. In some embodiments, the method also includes maintaining a temperature difference between the first pump head and the second pump head below 1.0 degree Celsius. In some embodiments, the method also includes maintaining the temperature difference between the first pump head and the second pump head below 0.5 degrees Celsius. In some embodiments, maintaining the temperature difference between the first pump head and the second pump head below 0.4 degrees Celsius. In some embodiments, the method also includes chilling the at least one stream of coolant fluid prior to flowing through the plurality of coolant passageways. In some embodiments, flowing at least one stream of coolant fluid includes: flowing a first coolant stream through a first coolant passageway within the first pump head, flowing the first coolant stream from an outlet of the first coolant passageway through a second coolant passageway within the second pump head, flowing the first coolant stream from an outlet of the second coolant passageway through a third coolant passageway within the second pump head, and flowing the first coolant fluid from an outlet of the third coolant passageway through a fourth coolant passageway within the first pump head. In some embodiments, flowing at least one stream through a plurality of coolant passageways includes: flowing a first stream of coolant fluid from a coolant fluid source through a first coolant passageway within a first pump head, wherein the first coolant passageway has an inlet into the first pump head and an outlet out of the first pump head, flowing the first stream of coolant fluid from the outlet of the first coolant passageway to an inlet of a second coolant passageway within the first pump head, wherein the second coolant passageway has an inlet into the first pump head and an outlet out of the first pump head, flowing a second stream of coolant fluid from the coolant fluid source through a third coolant passageway within a second pump head, wherein the third coolant passageway has an inlet into the second pump head and an outlet out of the second pump head, and flowing the second stream of coolant fluid from the outlet of the third coolant passageway to an inlet of a fourth coolant passageway within the second pump head, wherein the fourth coolant passageway has an inlet into the second pump head and an outlet out of the second pump head, wherein the temperature differential between the first stream of coolant fluid upon exiting the second coolant passageway and the second stream of coolant fluid upon exiting the fourth coolant passageway is less than 1.0 degree Celsius. In some embodiments, the method also includes separating the coolant fluid from a single coolant fluid source into the first stream of coolant fluid and the second stream of coolant fluid. In some embodiments, the method also includes combining the first stream of coolant fluid and the second stream of coolant fluid into a single stream after flowing the first stream through the second coolant passageway and flowing the second stream through the fourth coolant passageway.

The present disclosure provides a number of advantages over current methods, systems and apparatus. For instance, providing a balanced average heat transfer between the pump heads will result in more stable compressibility and density properties for fluids, especially highly compressible fluids, such as $CO_2$ or Freon, being pumped by the pumps. This increased stability in temperature, compressibility, and density is particularly useful in $CO_2$-based chromatography systems where the density of the $CO_2$ varies greatly based on temperature.

BRIEF DESCRIPTION OF THE DRAWINGS

The foregoing and other features and advantages provided by the present disclosure will be more fully understood from the following description of exemplary embodiments when read together with the accompanying drawings, in which.

DETAILED DESCRIPTION OF THE TECHNOLOGY

Figure 1:
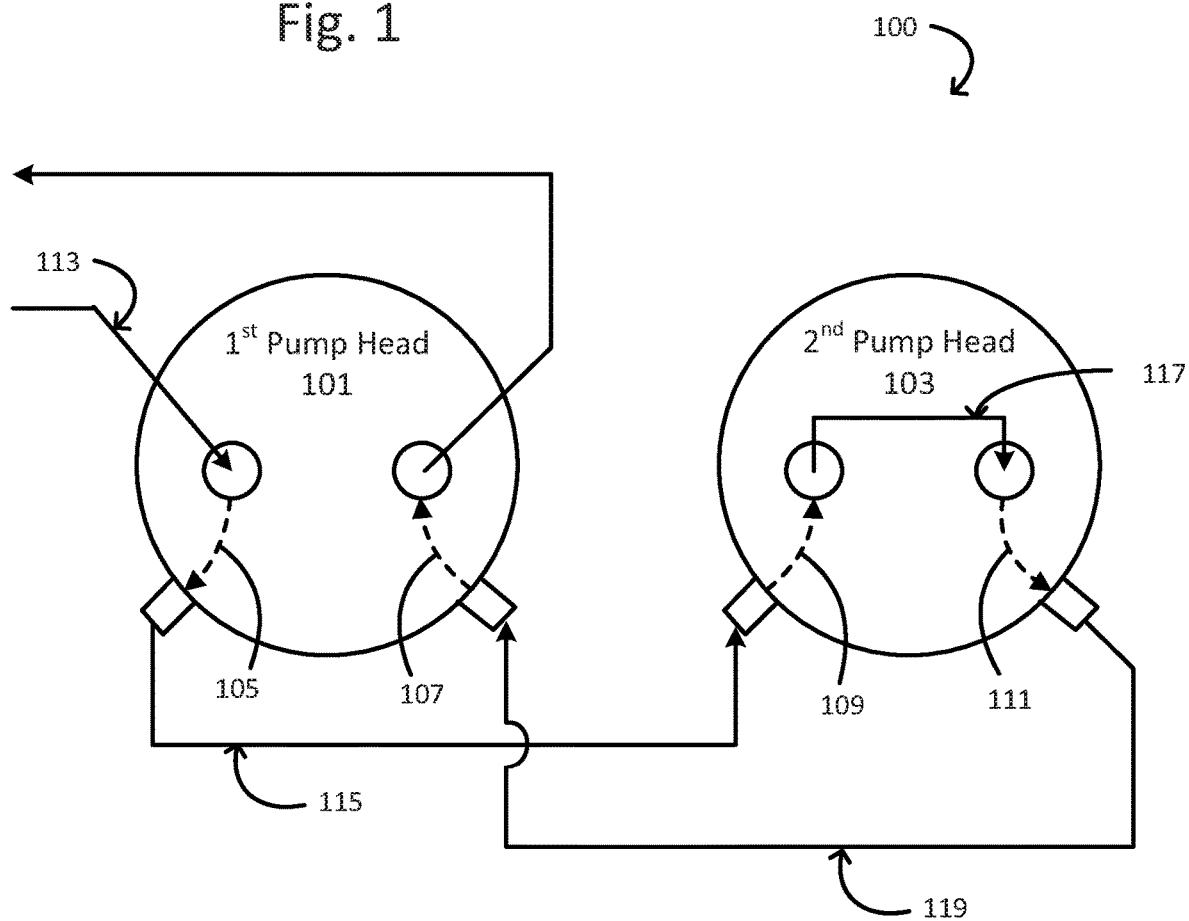
FIG. 1 illustrates an exemplary recursive pump head cooling system, according to one embodiment of the present disclosure.

Provided herein are methodologies, systems, and apparatus for cooling pump heads to provide a balanced level of heat transfer between the pump heads. In chromatography systems, a mobile phase is typically delivered using multiple pumps in a serial or parallel fashion. $CO_2$-based chromatography systems differ from other forms of chromatography in that the mobile phase includes $CO_2$. In general, the $CO_2$ or $CO_2$ mixture (e.g. $CO_2$ mixed with a solvent such as methanol) is used in a supercritical or near supercritical fluid state, and suitable temperature and pressure levels must be maintained. While pumping the mobile phase, the pump heads themselves may be cooled in order to prevent heating of the mobile phase, which may cause unwanted changes in the density of the $CO_2$. Because a mobile phase containing $CO_2$ differs greatly in density at different temperatures, it is important to maintain a consistent temperature between the pumps. The difference in temperature between the multiple pump heads may be reduced by using a heat exchange fluid or coolant of a given temperature that is in contact with each of the pump heads within the multi-pump system. This may be accomplished by flowing a coolant fluid through passageways within each of the pump heads in a parallel or recursive flow pattern.

To reduce the temperature difference between multiple pump heads, a balanced cooling system is disclosed which provides a substantially equal average heat transfer between each of the pump heads and the coolant fluid. As provided herein, the coolant fluid flows through a number of coolant passageways within each pump head in a parallel or recursive pattern in order to provide balanced cooling to each pump head and prevent density differences between the mobile phase fluids being pumped by each of the pump heads.

In a recursive coolant flow pattern, the coolant fluid first passes through a coolant passageway within the first pump head, and then through a coolant passageway within the second pump head to provide the novel balancing of temperatures between pumps that is to provide substantially equal heat transfer between multiple pumps used in a fluid system. Because the coolant fluid was at its coldest temperature when it initially passed through the first pump head, the coolant fluid is then transferred to the second pump head before passing through a second coolant passageway within the first pump head (the first pump head includes a first and second coolant passageway). Thus, the first pump head comes in contact with the coolant fluid at its coldest and warmest temperatures, while the second pump head comes in contact with the coolant fluid in the intermediate temperature stages, thus providing a more balanced cooling effect between the two pump heads. As will be appreciated, the recursive flow pattern may be implemented with three, four, or any number of pump heads.

In a parallel coolant flow pattern in accordance with the present technology, the coolant fluid is divided into two different coolant fluid streams of substantially equal temperature, which are each directed through the coolant passageways within one of the first or second pump heads. In other embodiments, a balanced pump head cooling system may involve dividing a coolant fluid into two coolant fluid streams, each of which is used to recursively cool two or more pump heads. Thus, two or more recursive cooling patterns may be connected in parallel. As will be appreciated, any number of combinations of parallel and/or recursive coolant flow patterns may be implemented, and the present disclosure is not intended to be limited to any particular configuration, number of pump heads, or number of coolant fluid streams.

In some embodiments, the pump head materials that come in contact with the mobile phase may include, for example, stainless steel, sapphire, ultra high molecular weight polyethylene (UHMWPE), ruby, ethylene tetrafluoroethylene (ETFE), ceramic, fluorocarbon polymer, polyether ether ketone (PEEK), or other suitable materials. The pump head may have a flow rate range of between about 0.50-150.00 mL/min, in some embodiments. In other embodiments, the flow rate may be as high as 350 mL/min. The flow rate may be adjustable in increments of as low as 0.01 mL/min, in some embodiments. The pumps may operate at pressures as high as 50 MPa, in some embodiments. In one specific example, the pumps may be binary gradient module (BGM) 2545 pumps that can be used as a primary solvent delivery device for a preparative or analytical chromatography system. Such pumps may provide smooth pulse-free flow for both analytical and preparative chromatography systems.

Table 1 below provides test results from a two-pump system operating at ambient temperature (23° C.) and chilled using a Thermo Scientific RTE 7 refrigerated bath chiller set to 4° C. In this example, the two pump heads, identified as a right pump head and a left pump head, were cooled by flowing a coolant fluid in a serial (e.g., the coolant passes from the first pump to the second pump), recursive, and parallel flow pattern through fluid passageways at two locations within each pump head. The temperature at the first location in the left pump head is indicated as L1, the temperature at the first location in the right pump head is indicated as R1, the temperature at the second location of the left pump head is indicated as L2, and the temperature at the second location of the right pump head is indicated as R2.

TABLE 1

| Configuration | Temperature T1 (° C.) | | | Temperature T2 (° C.) | | | Ave. (° C.) |
|---|---|---|---|---|---|---|---|
| | L1 | R1 | R1 − L1 | L2 | R2 | R2 − L2 | R-L |
| Serial | 7.3 | 8.4 | 1.1 | 11.0 | 11.8 | 0.8 | 0.95 |
| Recursive | 7.3 | 7.6 | 0.3 | 11.1 | 11.5 | 0.4 | 0.35 |
| Parallel with Y-Connector | 7.5 | 8.1 | 0.6 | 11.3 | 11.6 | 0.3 | 0.45 |

As can be seen in Table 1, when the pump heads are cooled using a serial coolant fluid flow pattern, the difference in temperature between the right pump head and the left pump head at the first location (R1-L1) is measured at 1.1° C., and the difference in temperature between the right pump head and the left pump head at the second location (R2-L2) is measured at 0.8° C. Thus, the average difference in temperature between the right pump head and the left pump head is about 0.95° C., which can result in significant differences in the density of a $CO_2$-based mobile phase between the two pump heads.

In contrast, when the pump heads are cooled using a recursive coolant fluid flow pattern, the difference in temperature between the right pump head and the left pump head at the first location (R1-L1) is 0.3° C., and the difference in temperature between the right pump head and the left pump head at the second location (R2-L2) is 0.4° C. This results in an average difference in temperature between the right pump head and the left pump head of about 0.35° C., which is less than half the temperature difference provided by the serial coolant fluid flow pattern. Similarly, when the pump heads are cooled using a parallel coolant fluid flow pattern, the difference in temperature between the right pump head and the left pump head at the first location (R1-L1) is 0.6° C., and the difference in temperature between the right pump head and the left pump head at the second location (R2-L2) is 0.3° C. This results in an average difference in temperature between the right pump head and the left pump head of about 0.45° C. Although examples are provided with two pump heads, the same techniques and advantages may be obtained when cooling more than two pump heads, according to exemplary embodiments of the present disclosure.

FIG. 1 illustrates an exemplary recursive pump head cooling system, according to one embodiment of the present disclosure. The system includes a first pump head 101, having a first coolant passageway 105 and a second coolant passageway 107, and a second pump head 103, having a first coolant passageway 109 and a second coolant passageway 111. As illustrated in the following figures, the dotted lines (105, 107, 109, 111, etc.) indicate coolant passageways that pass through an internal portion of the pump heads. The coolant fluid 113 is initially flowed to an entrance of the first coolant passageway 105 of the first pump head 101. At this point, the coolant fluid 113 is at its coolest temperature because it has not yet been subjected to heat transfer from either of the pump heads. After flowing out of the first coolant passageway 105 of the first pump head, the coolant fluid is flowed to the first coolant passageway 109 of the second pump head 103. The coolant fluid exits the first coolant passageway 109, exiting the second pump head 103, and subsequently re-enters the second pump head 103 at an entrance of the second coolant passageway 111 of the second pump head 103. Finally, after exiting the second coolant passageway 111 of the second pump head 103, the coolant fluid is flowed to an entrance of the second coolant passageway 107 of the first pump head 101. At this point, the coolant fluid 113 is at its warmest temperature because it has already been subjected to heat transfer from the first coolant passageway 105 of the first pump head, as well as both coolant passageways 109 and 111 of the second pump head 103. Thus, a more balanced average heat transfer is achieved between the two pump heads by cooling the first pump head 101 with the coolant fluid 113 while it is at its coolest and warmest points. In some embodiments, such a recursive flow pattern may provide a balanced cooling system such that the average temperature difference between the first pump head and the second pump head is below 1.0° C., 0.5° C., or 0.4° C.

The system may also include a first coolant tube 115 that fluidly couples the first coolant passageway 105 of the first pump head 101 with the first coolant passageway 109 of the second pump head 103, a second coolant tube 117 that fluidly couples the first coolant passageway 109 of the second pump head 103 with the second coolant passageway 111 of the second pump head 103, and a third coolant tube 119 that fluidly couples the second coolant passageway 111 of the second pump head 103 with the second coolant passageway 107 of the first pump head 101. The coolant tubes may be insulated coolant tubes, in some embodiments. In addition, these coolant tubes 115, 117, and 119 may be cooled with an additional chiller, in certain embodiments.

As discussed above, cooling the pump heads in a more balanced way will result in a more stable temperature between the pump heads and a more constant compressibility and density between the fluids being pumped by the pumps. This is especially desirable in $CO_2$-based chromatography systems where the mobile phase includes $CO_2$ and varies greatly in density depending on the temperature it is exposed to.

Figure 2:
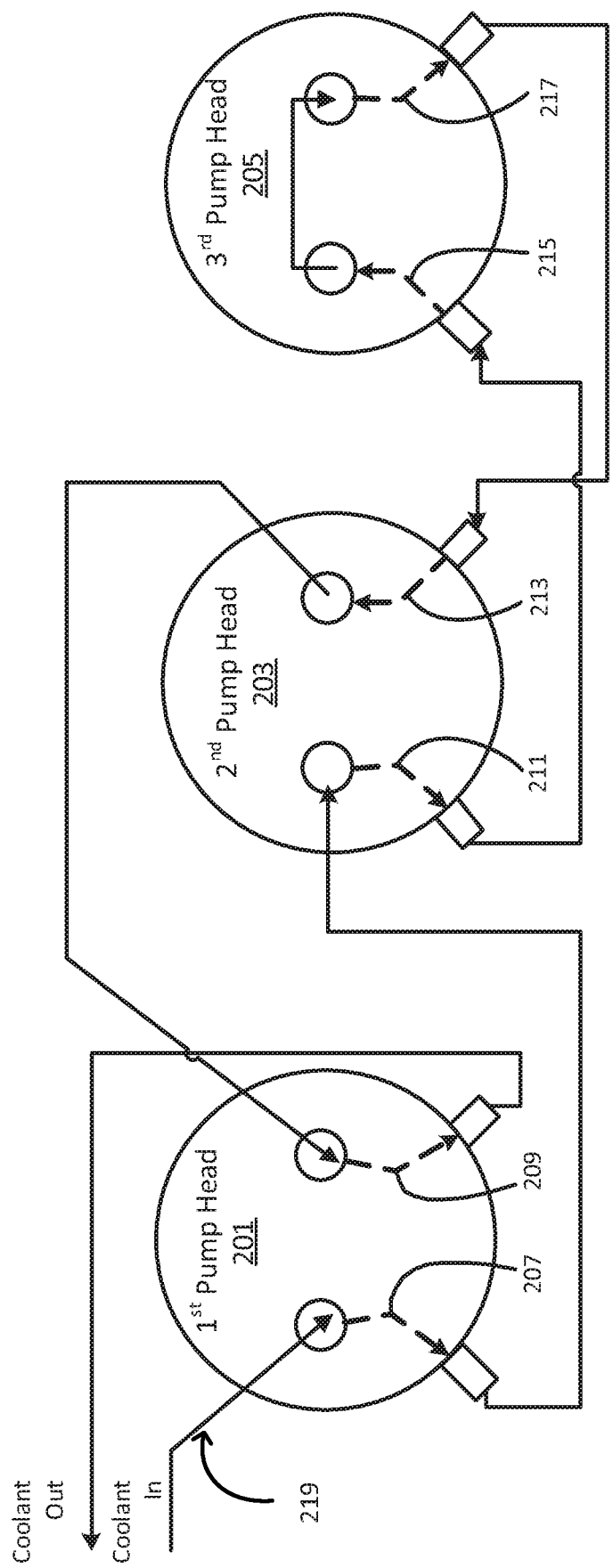
FIG. 2 illustrates an exemplary recursive pump head cooling system, adapted according to another embodiment of the present disclosure.

FIG. 2 illustrates an exemplary recursive pump head cooling system, adapted according to another embodiment of the present disclosure. This particular system includes a first pump head 201 having a first coolant passageway 207 and a second coolant passageway 209, a second pump head 203 having a first coolant passageway 211 and a second coolant passageway 213, and a third pump head 205 having a first coolant passageway 215 and a second coolant passageway 217. In this particular example, the coolant fluid 219 initially flows through the first coolant passageway 207 of the first pump head 201, then through the first coolant passageway 211 of the second pump head 203, and then through the first coolant passageway 215 of the third pump head 205. After flowing through the first coolant passageway 215 of the third pump head 205, the coolant fluid 219 is exits the third pump head 205 and re-enters at an entrance of the second coolant passageway 217 of the third pump head 205. After exiting the second coolant passageway 217 of the third pump head 205, the coolant fluid 219 is flowed to through the second coolant passageway 213 of the second pump head 203, and finally through the second coolant passageway 209 of the first pump head 201. Thus, a more balanced average heat transfer is achieved between the coolant fluid and the three pump heads 201, 203, and 205.

Figure 3:
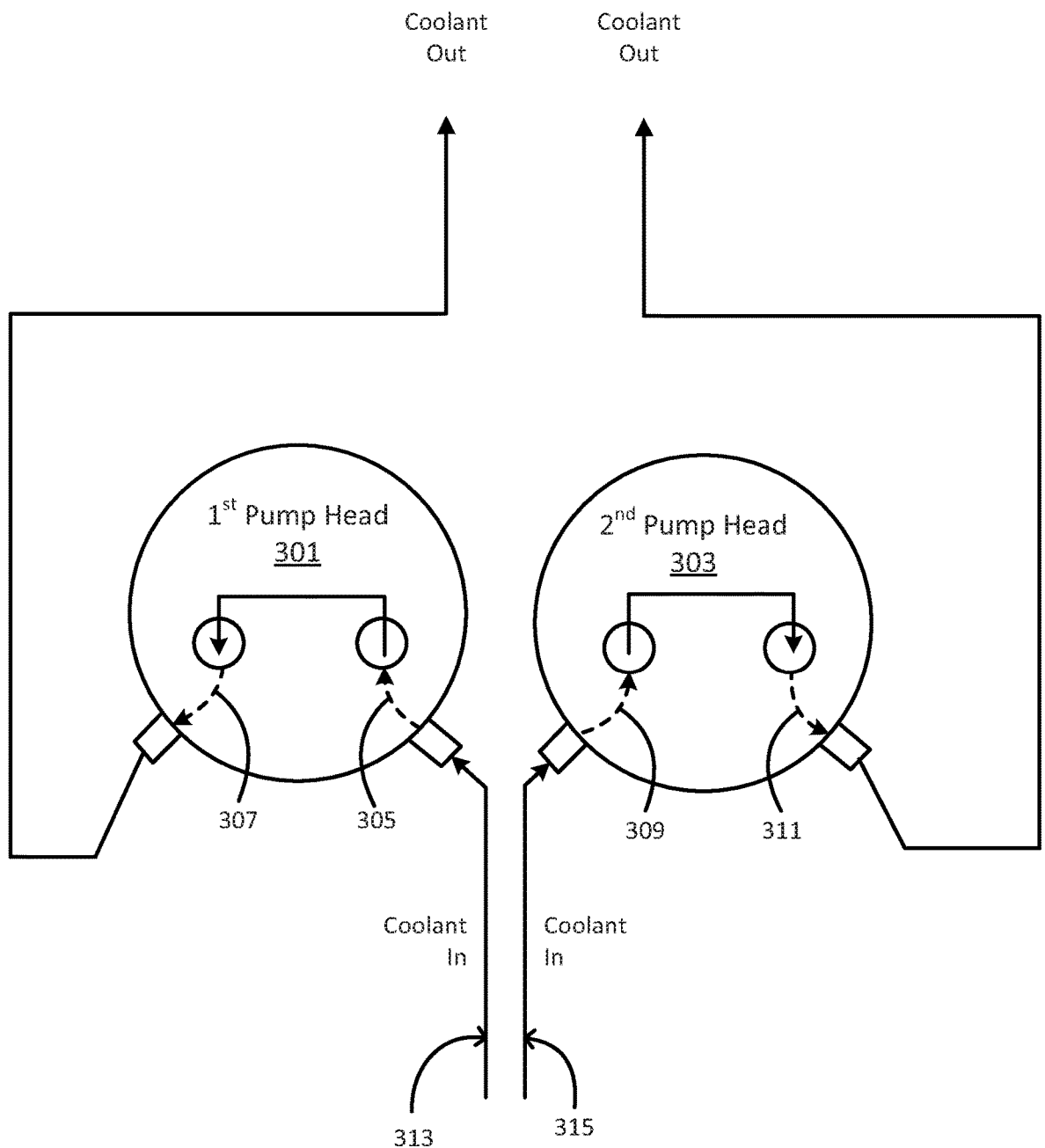
FIG. 3 illustrates an exemplary parallel pump head cooling system, adapted according to another embodiment of the present disclosure.

FIG. 3 illustrates an exemplary parallel pump head cooling system, adapted according to another embodiment of the present disclosure. This particular system includes a first pump head 301 having a first coolant passageway 305 and a second coolant passageway 307, and a second pump head 303 having a first coolant passageway 309 and a second coolant passageway 311. In contrast to the recursive coolant fluid flow pattern, the parallel coolant flow patter includes two coolant fluid streams 313 and 315. A first coolant fluid stream 313 is directed to the first pump head 301 and passes through the first coolant passageway 305. After exiting the first pump head 301 at the outlet of the first coolant passageway 305, the first coolant fluid stream 313 re-enters the first pump head 301 at an inlet of the second coolant passageway 307. Meanwhile, the second coolant fluid stream 315 is directed to the second pump head 303 and passes through the first coolant passageway 309. After exiting the second pump head 303 at the outlet of the first coolant passageway 309, the second coolant fluid stream 315 re-enters the second pump head 303 at an inlet of the second coolant passageway 311. In this particular example, the first coolant fluid stream 313 and the second coolant fluid stream 315 are both initially cooled to substantially the same temperature, and they may be pumped using a single coolant pump.

Figure 4:
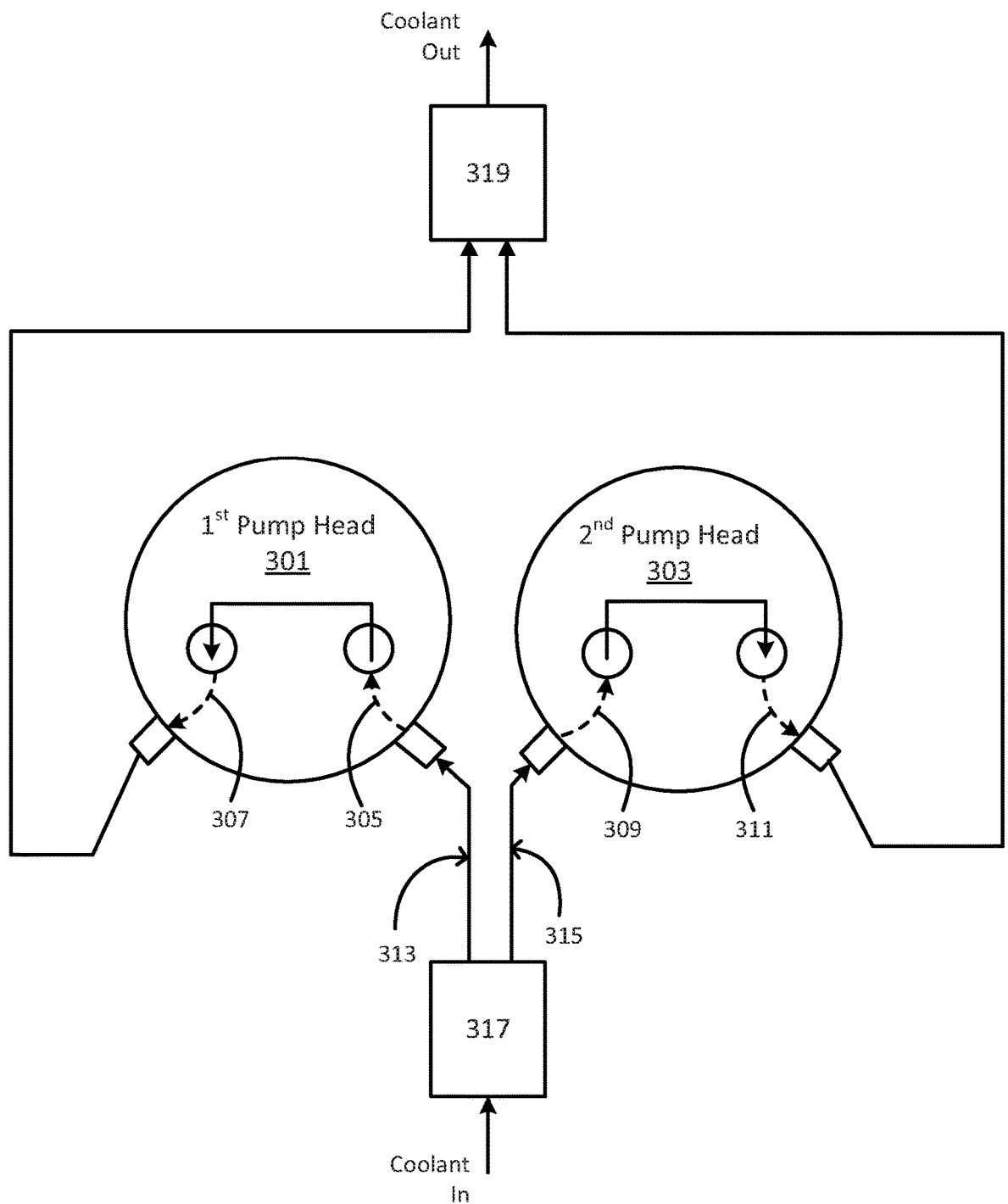
FIG. 4 illustrates an exemplary parallel pump head cooling system, adapted according to another embodiment of the present disclosure.

FIG. 4 illustrates an exemplary parallel pump head cooling system, adapted according to another embodiment of the present disclosure. In this particular embodiment, the system is configured substantially as described above in reference to FIG. 3, only with the addition of a fluid divider 317 for dividing the coolant fluid into the first coolant stream 313 and the second coolant stream 315, and a fluid connector 319 for combining the two fluid streams after having passed through the coolant passageways 305, 307, 309, and 311 of the pump heads 301 and 303.

Such parallel coolant flow patterns as described in FIGS. 3 and 4 decrease the average temperature difference between the pump heads, as compared with a serial coolant flow pattern, and provides more consistent compressibility and density for the fluids flowing between the pumps. This increased stability in temperature, compressibility, and density is especially desirable in $CO_2$-based chromatography systems where the mobile phase includes $CO_2$ and varies greatly in density depending on the temperatures or temperature differences it is exposed to.

Figure 5:
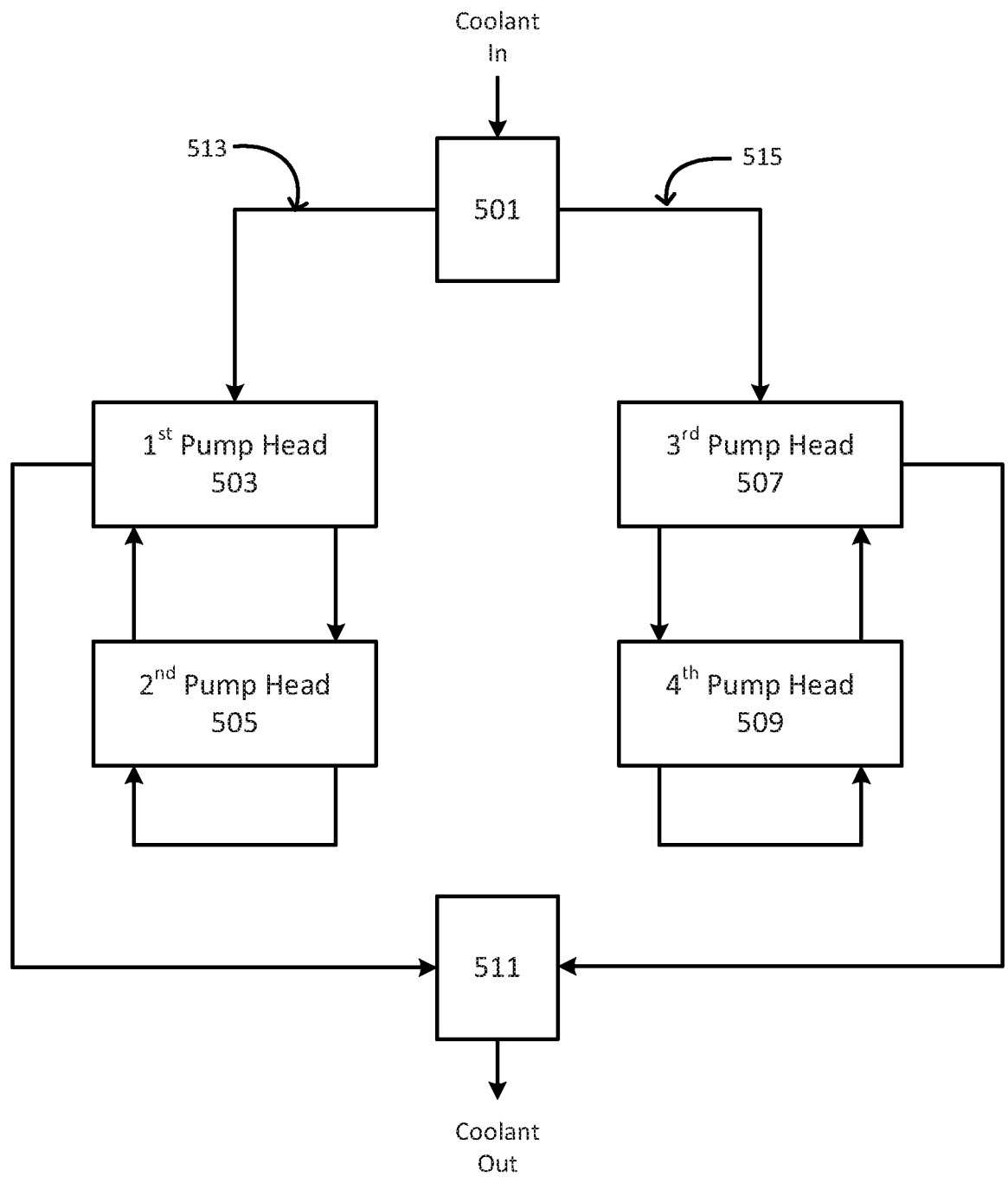
FIG. 5 depicts a block diagram of an exemplary pump head cooling system, adapted according to one embodiment of the present disclosure.

FIG. 5 depicts a block diagram of an exemplary pump head cooling system, adapted according to one embodiment of the present disclosure. In this example system, the coolant fluid is configured to cool four pump heads in a combination parallel/recursive fluid flow pattern. This system includes a first pump head 503 and a second pump head 505 configured with a recursive coolant fluid flow pattern and connected in parallel with a third pump head 507 and a fourth pump head 509, which are also fluidly coupled with a recursive coolant fluid flow pattern. Thus, two recursive flow patterns may be connected in parallel in order to effectively cool four pump heads, according to some embodiments. The pump head cooling system of FIG. 5 incldes a fluid divider 501 that receives a coolant stream and divides it into two streams 513 and 515. Coolant fluid stream 513 is directed to the first pump head 503 and the second pump head 505, which are cooled in a recursive coolant flow pattern, while the coolant fluid stream 515 is directed to the third pump head 507 and the fourth pump head 509, which are also cooled in a recursive coolant flow pattern. After exiting their respective recursive flow patterns, the two coolant fluid streams 513 and 515 are recombined in the fluid connector 511. The fluid connector 511 and/or fluid divider 501 may be a Y-connector, in some embodiments, or any other suitable fluid divider or connector that can separate a fluid stream into two fluid streams or combine two fluid streams into a single fluid stream.

Figure 6:
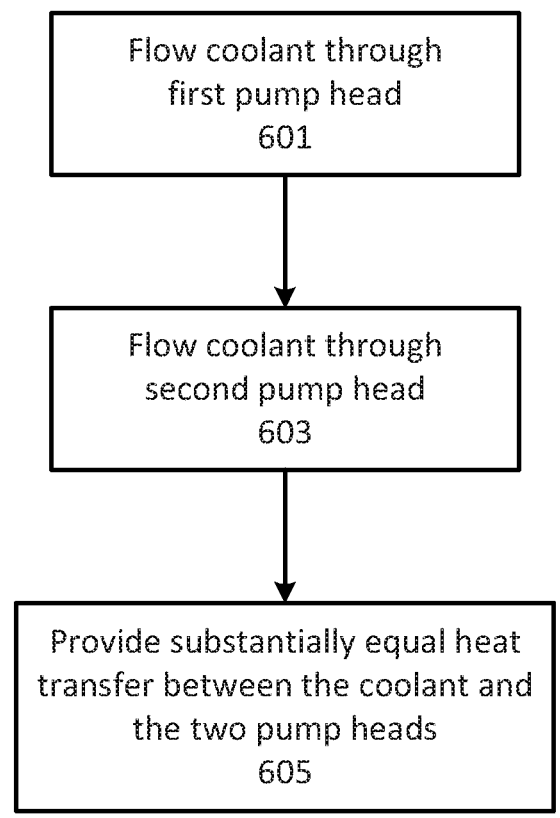
FIG. 6 is a flow chart of an exemplary method for providing substantially equal heat transfer between a coolant fluid and at least two pump heads, according to one embodiment of the present disclosure.

FIG. 6 is a flow chart of an exemplary method for providing substantially equal heat transfer between a coolant fluid and at least two pump heads, according to an embodiment of the present disclosure. In this particular embodiment, the method includes flowing 601 a coolant fluid through a first pump head, and flowing 603 the coolant fluid through a second pump head. As described above with reference to FIGS. 1-4, flowing the coolant fluid through the first and second pump heads may include flowing the coolant through a number of internal passageways within the pump heads. The method also includes, in this embodiment, providing 605 substantially equal heat transfer between the coolant fluid and the two pump heads. As discussed above in reference to Table 1, when two pump heads are cooled using a serial coolant flow pattern, the coolant fluid gets progressively warmer as it passes through the first pump head and then through the second pump head, resulting in an average temperature difference of almost one degree Celsius (0.95° C.) between the first pump head and the second pump head. This difference in temperature is caused, in part, by the coolant fluid being substantially warmer when cooling the second pump head compared to when it is cooling the first pump head. In some embodiments of the present disclosure, flowing the coolant fluid through the first pump head and the second pump head in a recursive or parallel flow pattern provides a substantially equal heat transfer between the coolant fluid and the two pump heads, which results in a decreased average temperature difference between the two pump heads. Specifically, in the example described in Table 1, an average temperature difference of less than one degree Celsius (0.35° C. for a recursive flow pattern and 0.45° C. for a parallel flow pattern) may be achieved. Because the coolant fluid passes through the pump heads in a recursive or parallel flow pattern, rather than a serial flow pattern, the heat transfer between the coolant fluid and the pump heads is balanced. That is, the path of the coolant fluid through the first pump head and the second pump head, and any other pump head, is designed or adapted to provide a more balanced heat transfer. For example, the path is designed or adapted to account for a warming effect on the coolant as it passes through the various pumps. The substantially equal heat transfer between the coolant fluid and the two pump heads is responsible, in part, for the increased temperature uniformity between the pump heads. In some embodiments, a coolant fluid flow pattern that produces a substantially equal heat between the coolant fluid and pump heads is one wherein the average temperature difference between the various pump heads is less than 0.95° C., less than 0.6° C., less than 0.5° C., less than 0.4° C., or less than 0.36° C.

Figure 7:
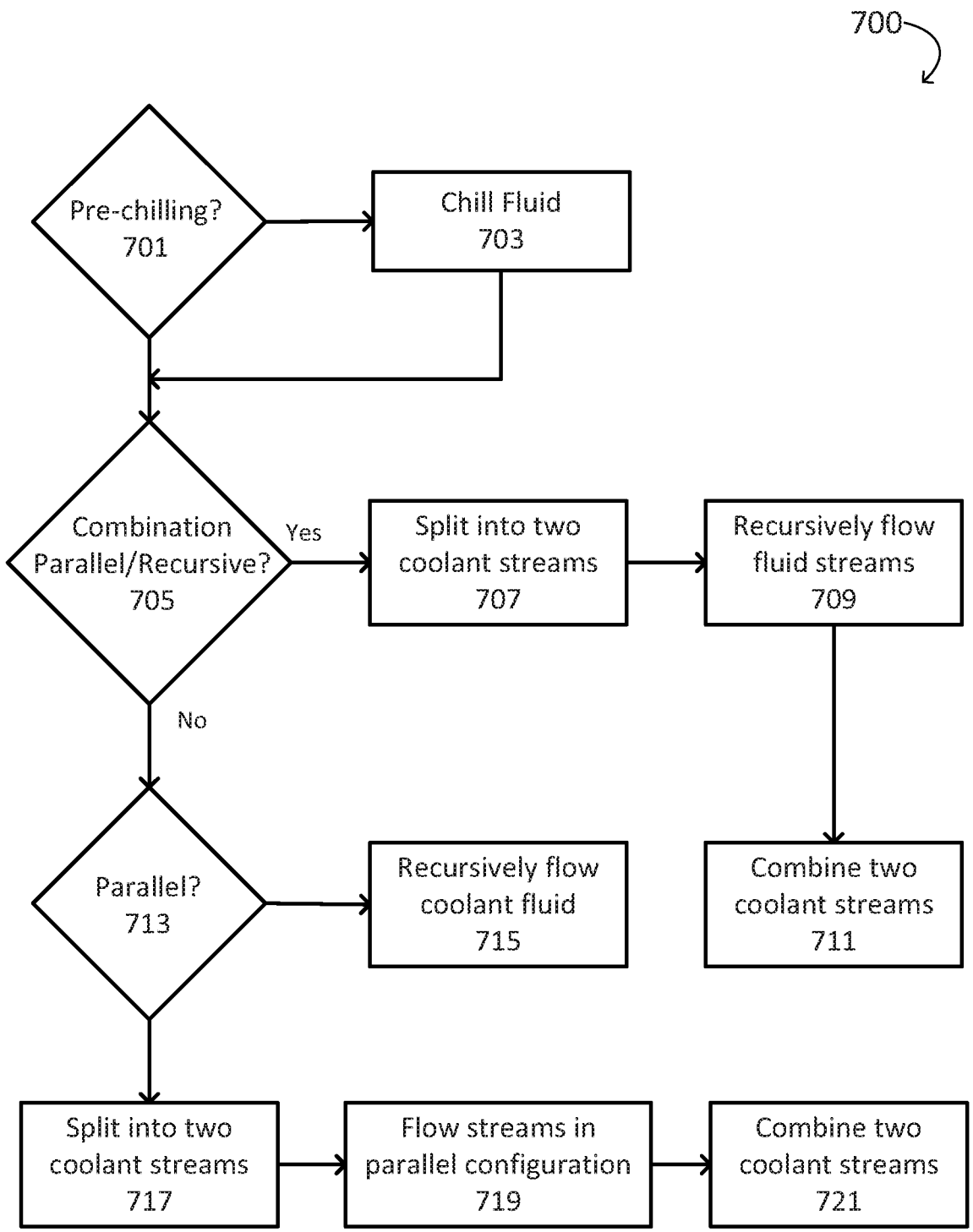
FIG. 7 is a flow chart of an exemplary method for cooling pump heads, according to an embodiment of the present disclosure.

FIG. 7 is a flow chart of an exemplary method for cooling pump heads, according to an embodiment of the present disclosure. In this particular embodiment, the method begins with determining 701 whether the coolant fluid is to be pre-chilled prior to cooling the pump heads. If the coolant is to be pre-chilled, the method continues with chilling 703 the coolant fluid using a suitable fluid chiller. The method then continues with determining 705 whether the pump head cooling system is a combination parallel and recursive system. If so, the coolant fluid is split 707 into two coolant streams and each coolant stream is recursively flowed 709 through its respective set of pump heads, as illustrated in FIG. 5. After exiting the recursive flow patterns, the two coolant streams are then combined 711 again into a single coolant stream.

If, however, the pump head cooling system is not a combination parallel and recursive system, the method continues with determining 713 whether the system is a parallel system. If not, the method continues with recursively flowing the coolant fluid through coolant passageways within the pump heads, as illustrated in FIGS. 1 and 2. If the system is a parallel cooling system, the method continues with splitting 717 the coolant fluid into two coolant fluid streams and flowing 719 the coolant fluid streams in a parallel configuration through the coolant passageways of the pump heads, as illustrated in FIGS. 3 and 4. After flowing 719 the coolant fluid streams in a parallel configuration through the coolant passageways of the pump heads, the method continues with combining 721 the coolant streams again into a single coolant stream. In some embodiments, flowing the coolant fluid through the passageways of the pump heads may be accomplished with one or more coolant pumps that can pump the coolant fluid through the cooling system 700.

In alternative embodiments, the techniques described above with respect to pumps used in $CO_2$-based chromatography systems may be applicable to pumps used in other types of chromatography systems that include mobile phases that vary greatly in density with minor changes in temperature. For example, a mobile phase including methanol at extremely high pressures may in some instances benefit from added temperature control. In describing exemplary embodiments, specific terminology is used for the sake of clarity. For purposes of description, each specific term is intended to at least include all technical and functional equivalents that operate in a similar manner to accomplish a similar purpose. Additionally, in some instances where a particular exemplary embodiment includes a plurality of system elements, device components or method steps, those elements, components or steps may be replaced with a single element, component or step. Likewise, a single element, component or step may be replaced with a plurality of elements, components or steps that serve the same purpose. Moreover, while exemplary embodiments have been shown and described with references to particular embodiments thereof, those of ordinary skill in the art will understand that various substitutions and alterations in form and detail may be made therein without departing from the scope of the invention. Further still, other aspects, functions and advantages are also within the scope of the invention.

Exemplary flowcharts are provided herein for illustrative purposes and are non-limiting examples of methods. One of ordinary skill in the art will recognize that exemplary methods may include more or fewer steps than those illustrated in the exemplary flowcharts, and that the steps in the exemplary flowcharts may be performed in a different order than the order shown in the illustrative flowcharts.

What is claimed is:

1. A pump head cooling system, comprising:
  a first pump head defining a first coolant passageway and a second coolant passageway, each passageway having an inlet into the first pump head and an outlet out of the first pump head; and
  a second pump head defining a third coolant passageway and a fourth coolant passageway, each passageway having an inlet into the second pump head and an outlet out of the second pump head;
  wherein the outlet of the first coolant passageway is fluidly coupled to the inlet of the third coolant passageway, the outlet of the third coolant passageway is fluidly coupled to the inlet of the fourth coolant passageway, and the outlet of the fourth coolant passageway is fluidly coupled to the inlet of the second coolant passageway.

2. The pump head cooling system of claim 1, wherein the first pump head and the second pump head are composed of stainless steel.

3. The pump head cooling system of claim 1, wherein the first pump head and the second pump head are adapted to operate at flow rates between 0.50-150.00 mL/min.

4. The pump head cooling system of claim 1, wherein the first pump head and the second pump head are adapted to operate at pressures up to 50 MPa.

5. The pump head cooling system of claim 1, further comprising a coolant pump adapted to pump a coolant fluid through the first coolant passageway, the second coolant passageway, the third coolant passageway, and the fourth coolant passageway.

6. The pump head cooling system of claim 5, further comprising a fluid chiller adapted to chill a coolant fluid prior to pumping the coolant fluid through the first coolant passageway.

7. The pump head cooling system of claim 1, further comprising:
   a first coolant tube adapted to fluidly couple the outlet of the first coolant passageway to the inlet of the third coolant passageway;
   a second coolant tube adapted to fluidly couple the outlet of the third coolant passageway to the inlet of the fourth coolant passageway; and
   a third coolant tube adapted to fluidly couple the outlet of the fourth couple passageway to the inlet of the second coolant passageway.

* * * * *